United States Patent Office 3,712,867
Patented Jan. 23, 1973

3,712,867
PROCESS FOR THE PRODUCTION OF MICROCAPSULES WITH THE AID OF SYNTHETIC COACERVATES AND MICROCAPSULES PRODUCED THEREBY
Nikolaus Schon, Leverkusen, Hildegard Schnoring, Wuppertal-Elberfeld, Josef Witte, Cologne-Stammheim, and Gottfried Pampus, Leverkusen, Germany, assignors to Bayer Aktiengesellschaft, Leverkusen, Germany
No Drawing. Filed Feb. 17, 1971, Ser. No. 116,253
Claims priority, application Germany, Mar. 4, 1970,
P 20 10 110.4
Int. Cl. B01j 13/02; B44d 1/02
U.S. Cl. 252—316
8 Claims

ABSTRACT OF THE DISCLOSURE

A process for the production of microcapsules with coacervates of synthetic polymers as shell substance, wherein the solid or liquid core material to be encapsulated is dispersed in an aqueous solution of a thermoreversible coacervating copolymer of 70 to 30 mol percent of the acrylic acid and 30 to 70 mol percent of acrylamide at a temperature above the coacervate transition temperature, the resulting dispersion is cooled to below the coacervate transition temperature, the coacervate formed is deposited onto the dispersed particles, is optionally chemically crosslinked, and the microcapsules obtained are separated off and dried.

---

Microcapsules are obtained by encapsulating particles or drops of substances (core material) in a polymeric material (shell substance). Through encapsulation, the core material is temporarily protected and can only be released under predetermined conditions. It is possible in this way, for example, to retard the effect of medicaments (gradual dissolution of the shell material) or to produce adhesive or colour tapes which liberate the adhesives or dyes under the effect of pressure (destroying the capsules by pressure).

There are numerous processes for the production of microcapsules from aqueous media, using coacervates for shell formation. Coacervates (polymer-rich phases) are formed at certain concentrations and at certain pH values and temperatures when, for example, gelatin is reacted with gum arabic or other, even synthetic, carboxyl-group-containing polymers in aqueous solution. Since the quality of the gelatin, being a modified naturally occurring product, fluctuates considerably (molecular weight, isoelectric point and impurity content are not constant), the coacervation conditions have to be continuously changed in order to obtain coacervates of uniform quality in the high yields that are absolutely essential for an economic encapsulating process.

The present invention provides a process for the production of microcapsules with coacervates of synthetic polymers as shell substance wherein the solid or liquid core material to be encapsulated is dispersed in an aqueous solution of a thermoreversible coacervating copolymer, of 70 to 30 mol percent of acrylic acid and 30 to 70 mol percent of acrylamide at a temperature above the coacervate transition temperature, the resulting dispersion is cooled to below the coacervate transition temperature, the coacervate formed is deposited onto the dispersed particles, is optionally chemically crosslinked, and the resulting microcapsules are separated off and dried.

The aqueous solutions of the thermoreversibly coacervating copolymers can be prepared from mixtures of 70 to 30 mol percent of acrylic acid and 30 to 70 mol percent of acrylamide in aqueous medium in an oxygen-free atmosphere, for example under nitrogen or argon. Copolymerisation can be carried out in 3 to 30% by weight aqueous solutions of the aforementioned monomers at temperatures of from 20 to 80° C. Conversions in excess of 95% are usually obtained after 1 to 3 hours at polymerisation temperatures of from 30 to 35° C. The catalysts used for this copolymerisation reaction are Redox catalysts, for example combinations of potassium persulphate $K_2S_2O_8$ or ammonium persulphate $(NH_4)_2S_2O_8$, with a reducing agent, such as sodium pyrosulphate $(Na_2S_2O_5)$, sodium sulphite $Na_2SO_3$, sodium bisulphite $NaHSO_3$, sodium thiosulphate $Na_2S_2O_3$, sodium dithionite $Na_2S_2O_4$, a corresponding potassium salt, sodium formaldehyde sulphoxylate $NaO-SO-CH_2OH$, formamidine sulphinic acid or sodium-p-toluene sulphinate. The quantity of the oxidising catalyst component (persulphate) can be from 0.03 to 5 parts by weight per 100 parts by weight of total monomer. The reducing agents are generally used in quantities corresponding to from $\frac{1}{3}$ to $\frac{3}{4}$ of the equivalent of the oxidising agent.

If the polymerisation temperature is above the coacervate transition temperature, coacervates are obtained from the aqueous polymer solutions on cooling to below this temperature. If the polymerisation temperature is below the coacervate transition temperature, the coacervates are actually precipitated during the polymerisation reaction. The coacervate transition temperature is generally from 15 to 30° C., being governed to some extent by the catalyst system and also by the monomer ratio. Above the coacervate transition temperature, the coacervates dissolves again to form homogeneous polymer solutions. On cooling to below this temperature, hazing occurs again and the coacervate precipitates in the form of a lower phase. The coacervate/polymer solution transition is reversible and can be carried out as often as required in either direction by corresponding changes in temperature. Copolymers containing 50 mol percent of acrylamide and 50 mol percent of acrylic acid have the highest coacervate transition temperatures. The transition temperature can be reduced by increasing the quantity of one of the two components. The coacervates have a water content of from 70 to 90% by weight and are free-flowing viscous to pasty masses whose consistency is also governed to a considerable extent by the molecular weight of the copolymers.

To carry out the encapsulation process according to the invention, the solid or liquid core material to be encapsulated is dispersed or emulsified in the aforementioned copolymers in the form of a 3 to 30% by weight aqueous solution at a temperature above the coacervate transition temperature, using the usual mixtures of homogenisers (e.g. high speed stirrers or vibra-mixers etc.). The core substances can also be used in the form of a solution in a water-insoluble solvent.

Although dispersion aids can be added at this stage, they are usually unnecessary because the copolymer itself has a strong dispersing effect.

The process is suitable for encapsulating any totally or substantially water-insoluble solids, liquids or non-aqueous solutions. It is also possible to encapsulate water-soluble substances, providing they are dispersed in the polymer solution as a reverse emulsion in a water-insoluble organic solvent. Some groups of substances which can be encapsulated by the process according to the invention are: pharmaceuticals and plant-protection agents (for example to produce a long-term effect or for concealing taste or odour), foodstuffs and food additives (for example spices and aromatic substances), dyes (for example inorganic or organic pigments and dye solutions), chemicals, lubricants and greases or other oils, adhesives and bonding agents. It is also possible to encapsulate mixtures of different substances.

After the core material has been dispersed in the polymer solution, the dispersion is slowly cooled, with stirring or mixing, to temperatures below the coacervation temperature so that the coacervate is deposited onto the dispersed core material and envelops it like a shell.

The diameter of the microcapsules obtained is thus determined by the particle size of the dispersed core material and also by the wall thickness of the shells, i.e. by the quantity of coacervate surrounding the individual particles. The quantity of shell substance in the finished microcapsules can preferably vary from 5 to 50% by weight.

The shells of the microcapsules can be solidified to a considerable extent by cooling to temperatures around 0° C. In order to isolate the capsules, however, it is advisable to add a water-soluble non-solvent for the coacervate, for example methanol, ethanol, acetone or propanol, in order to remove water from the coacervate shells, to reduce tackiness and to increase the strength of the shell. The coacervate shells can also be chemically crosslinked. For this purpose, it is possible to add polyvalent metal ions (in the form of their salts), for example aluminium salts, zirconium salts or even Cr-III-salts, nickel, bismuth, copper or cerium salts, and to adjust the pH value to the range from 3 to 6. The degree of crosslinking can be adjusted through the quantity of metal salt added. The coacervate shells can also be effectively crosslinked by the addition of alkali metal salts of amphoteric metal hydroxylates such as sodium aluminate.

Crosslinking can also be carried out with reactive aldehydes or dialdehydes, for example formaldehyde or glutarodialdehyde. Crosslinking with metal salts takes place very quickly, crosslinking with aldehydes is more gradual.

The microcapsules, hardened by the addition of non-solvents or by crosslinking, can then be separated off (for example by filtration or centrifuging) and dried (for example with a fluidised-bed, air stream or vibration system, etc.).

In one embodiment of the process, the core material to be encapsulated is dispersed in the aqueous solution of the copolymer at a temperature above the coacervate transition temperature, and the dispersion or emulsion obtained is cooled by introducing it in the form of preformed particles, into water whose temperature is below the coacervate transition temperature, and preferably below 10° C., resulting in the development of spherical coacervate particles which can be surface-hardened by the addition of salts of polyvalent ions, for example aluminium salts, so that they can be isolated and dried. Microgranulates are obtained in which the dispersed core material particles are present in a polymer matrix. Introduction of the dispersion or emulsion in the form of preformed particles can be carried out by spraying the dispersion in air and by introducing the spherical particles into the stirred cold water phase which may also directly contain the polyvalent ions required for hardening. It is also possible to introduce the pre-formed particles into a water-miscible solvent whose temperature is preferably below the coacervate transition temperature so that particles with a solid shell are formed which can be separated off and dried in known manner to give microgranulates in this special instance, too. Examples of suitable water-miscible organic solvents include methanol, ethanol and acetone, etc. The diameter of the pre-formed particles can be determined by selecting the nozzle diameter and the pressure under which the dispersions or emulsions are delivered through the nozzles. The diameter of the microgranulates finally obtained is further governed by the polymer concentration of the solution used. In this modified form of the process, it is possible to produce microgranulates with particle sizes of from about 100μ to several millimetres.

According to the invention, it is possible to produce microcapules with diameters of from 30μ to several millimetres. The process according to the invention enables the coacervate to be reproducibly synthesised, i.e. the encapsulating conditions and hence the properties of the microcapsules can be kept constant. The copolymer is precipitated almost quantitatively in coacervate form so that the shell yield is optimal.

Since the coacervates can be chemically crosslinked in various different ways, or the shells can be produced from uncrosslinked polymer, the encapsulated substances can also be released in various ways. For instance, it is possible to produce water-soluble shells which immediately release the contents of the capsule on contact with water, or to produce water-insoluble capsules which only become porous and permeable in alkalis (weak crosslinking). Highly crosslinked shells are correspondingly impervious even to water and are particularly suitable for microcapsules whose contents are to be released under pressure (by mechanical stressing or, optionally, by increase in temperature). It is also possible to dissolve other substances, for example even polymers, in the polymer solution, so that a more or less large proportion of these substances is included in the shell during coacervation. Accordingly, hydrophilic polymers can lead to a fairly high degree of porosity in water in the case of highly crosslinked capsule shells.

In the following examples parts and percentages are by weight.

EXAMPLE 1

Preparation of a copolymer 1850 parts by weight of distilled water, 80 parts by weight of acrylic acid and 80 parts by weight of acrylamide are mixed in a vessel equipped with stirring mechanism in the absence of oxygen in a nitrogen atmosphere, followed by the addition at 20° C. of 0.6 part by weight of $(NH_4)_2S_2O_4$ and 0.3 part by weight of $Na_2SO_3$, each dissolved in 20 parts by weight of water. This solution was then heated to 35° C., and polymerization began immediately, accompanied by an increase in the viscosity of the solution. After 2 hours, the conversion amounted to almost 100%. On cooling to 25° C., the polymer solution separated into two phases, an upper phase comprising approximately 960 parts by weight of almost pure water, and a lower phase, the concentrate, containing the polymer.

EXAMPLE 2

30 parts of paraffin oil were dispersed at 45° C. in 90 parts of the polymer solution of Example 1 using a high speed stirrer. The dispersion was cooled with vigorous stirring at 20° C., as a result of which the coacervate was formed around the oil droplets. The dispersion was diluted with 200 parts by weight of water at 10° C. and quickly adjusted to pH 11 to 12 at this temperature with 10% by weight aqueous NaOH. Approximately 200 parts by weight of a 10% by weight aluminium sulphate solution were then added, so that the pH value fell to 5.5. After the aluminium sulphate had been added, microcapsules with solid shells were formed. After filtration under suction and drying at 40° C. in an air stream, 38 parts by weight of a powder (microcapsules with paraffin oil inside) were formed having an average particle size of 50μ.

EXAMPLE 3

6.5 parts of the phosphorus compound:

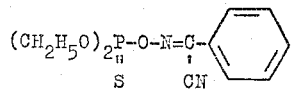

were dispersed (high speed stirrer) at 40° C. in 100 parts by weight of polymer solution prepared in the manner described in Example 1, except that it had been reduced by dilution to a polymer concentration of 6.5% by weight.

The dispersion was cooled to 15° C. with thorough stirring (30 minutes), as a result of which the coacervate formed was deposited around the oil droplets. The dispersion was cooled to a temperature from 5 to 10° C., followed by the addition of 10% by weight sodium aluminate solution until a pH value of 7 was reached. The shells of the microcapsules were hardened, with the result that they could be isolated by filtration under suction and drying at 35 to 40° C. in a drying cabinet. 13.5 parts by weight of a free-flowing powder with an average particle size of 50μ were obtained. Inside, the microcapsules contained the oily phosphorus compound.

EXAMPLE 4

10 parts by weight of carbon black were dispersed at 50° C. in 100 parts by weight of copolymer solution of Example 1. The carbon black particles were enveloped in coacervate by cooling with vigorous stirring to a temperature from 20 to 25° C. The dispersion was diluted with 100 parts by weight of water at 15° C. The shells were hardened by the addition of 10% by weight sodium aluminate solution, accompanied by an increase in the pH value to 7. The microcapsules were filtered under suction and dried at 50° C. 18.5 parts by weight of a free-flowing powder having particle sizes of from 50 to 100μ were obtained.

We claim:

1. A process for the production of microcapsules having coacervates of a synthetic polymer as the shell substance wherein a solid or liquid core material to be encapsulated is dispersed in an aqueous solution of a thermoreversible coacervating copolymer of 70 to 30 mol percent of acrylic acid and 30 to 70 mol percent of acrylamide at a temperature above the coacervate transition temperature, the resulting dispersion is cooled to below the coacervate transition temperature to form the coacervate and deposit it on the dispersed particles to form microcapsules and the microcapsules are separated from the aqueous solution and dried.

2. The process as claimed in claim 1 wherein the dispersion is cooled by introducing it in the form of preformed particles into an aqueous phase whose temperature is below the coacervate transition temperature.

3. The process as claimed in claim 1 wherein the coacervate forming the shell is crosslinked before the microcapsules are separated and dried.

4. The process as claimed in claim 1 wherein the aqueous solution contains from 3 to 30% by weight of the copolymer.

5. The process as claimed in claim 1 wherein the shells of the microcapsules are hardened by the addition of a water-soluble non-solvent for the coacervate.

6. A process as claimed in claim 5 wherein the water-soluble non-solvent is methanol, ethanol, acetone or propanol.

7. A process as claimed in claim 3 wherein the coacervate is crosslinked by adding a polyvalent metal salt or an alkali metal salt of an amphoteric metal hydroxylate or by adding a reactive aldehyde or dialdehyde.

8. Microcapsules produced by the process of claim 1.

References Cited

UNITED STATES PATENTS

| 3,244,640 | 4/1966 | Studt et al. | 252—316 |
| 2,661,309 | 12/1953 | Azorlosa | 117—161 UN X |
| 2,886,445 | 5/1959 | Rosenthal et al. | 99—135 |

FOREIGN PATENTS

| 795,977 | 6/1958 | Great Britain | 424—37 |

RICHARD D. LOVERING, Primary Examiner

U.S. Cl. X.R.

8—79; 71—64 F; 99—140 R, 166; 106—308 M; 117—62.2, 100 A, 100 B; 161—DIG 1; 252—10, 182; 264—4; 424—33